(12) United States Patent
Allen

(10) Patent No.: US 11,415,918 B2
(45) Date of Patent: Aug. 16, 2022

(54) DETECTION OF PRINT MATERIAL DENSITY ABNORMALITIES

(71) Applicant: Hewlett-Packard Development Company, L.P., Spring, TX (US)

(72) Inventor: Michael Kenneth Allen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/257,038

(22) PCT Filed: Nov. 12, 2018

(86) PCT No.: PCT/US2018/060251
§ 371 (c)(1),
(2) Date: Dec. 30, 2020

(87) PCT Pub. No.: WO2020/101633
PCT Pub. Date: May 22, 2020

(65) Prior Publication Data
US 2021/0294256 A1    Sep. 23, 2021

(51) Int. Cl.
*G03G 15/00* (2006.01)
*G03G 15/01* (2006.01)

(52) U.S. Cl.
CPC ..... *G03G 15/5058* (2013.01); *G03G 15/0131* (2013.01); *G03G 15/5062* (2013.01); *G03G 2215/00059* (2013.01); *G03G 2215/00569* (2013.01)

(58) Field of Classification Search
CPC .......... G03G 15/5058; G03G 15/0131; G03G 15/5062; G03G 2215/00059; G03G 2215/00569; G03G 15/5041; G03G 15/043
See application file for complete search history.

(56) References Cited

U.S. PATENT DOCUMENTS

| | | |
|---|---|---|
| 6,505,010 B1 | 1/2003 | Izumizaki et al. |
| 7,110,687 B2 | 9/2006 | Furukawa |
| 8,948,631 B2 | 2/2015 | Honda |
| 2003/0085941 A1 | 5/2003 | Tezuka et al. |

(Continued)

*Primary Examiner* — Sandra Brase
(74) *Attorney, Agent, or Firm* — Brooks Cameron & Huebsch PLLC

(57) ABSTRACT

Example implementations relate to a system comprising a memory resource to store instructions executable by a processing resource. In some examples, the processing resource can execute instructions to perform a calibration procedure for a printing device including a printing component. Responsive to the calibration procedure, the processing resource can execute instructions to deliver a print material arranged in a compound shape to a calibration image on the printing component included in the printing device. Responsive to performing the delivery, the processing resource can execute instructions to measure a print material density of the print material on the calibration image of the compound shape during the calibration procedure via a density sensor included in the printing device. Furthermore, the processing resource can execute instructions to detect an abnormality in the print material density via signal analysis instructions and provide a notification regarding the print material density abnormality.

15 Claims, 10 Drawing Sheets

(56) References Cited

U.S. PATENT DOCUMENTS

| | | |
|---|---|---|
| 2006/0110175 A1 | 5/2006 | Nishida |
| 2006/0140650 A1 | 6/2006 | Yokote |
| 2008/0219687 A1 | 9/2008 | Shinichi |
| 2011/0217052 A1 | 9/2011 | Usui |
| 2012/0019850 A1 | 1/2012 | Tezuka |
| 2014/0111832 A1 | 4/2014 | Hayashi |
| 2016/0378040 A1* | 12/2016 | Kosuge .............. G03G 15/5058 399/72 |
| 2018/0150010 A1* | 5/2018 | Sone .................. G03G 15/5058 |
| 2020/0050139 A1* | 2/2020 | Takezawa .......... G03G 15/5041 |

\* cited by examiner

DETECTION OF PRINT MATERIAL DENSITY ABNORMALITIES

BACKGROUND

Printing systems, such as printers, fax machines, scanners, copiers, etc., may generate text, images, or objects on print media, such as paper, plastic, etc. In some examples, printing systems may perform a print job comprising printing text and/or graphics by transferring print material, such as ink, toner, agents, powders, etc., to print media.

DETAILED DESCRIPTION

Figure 1:
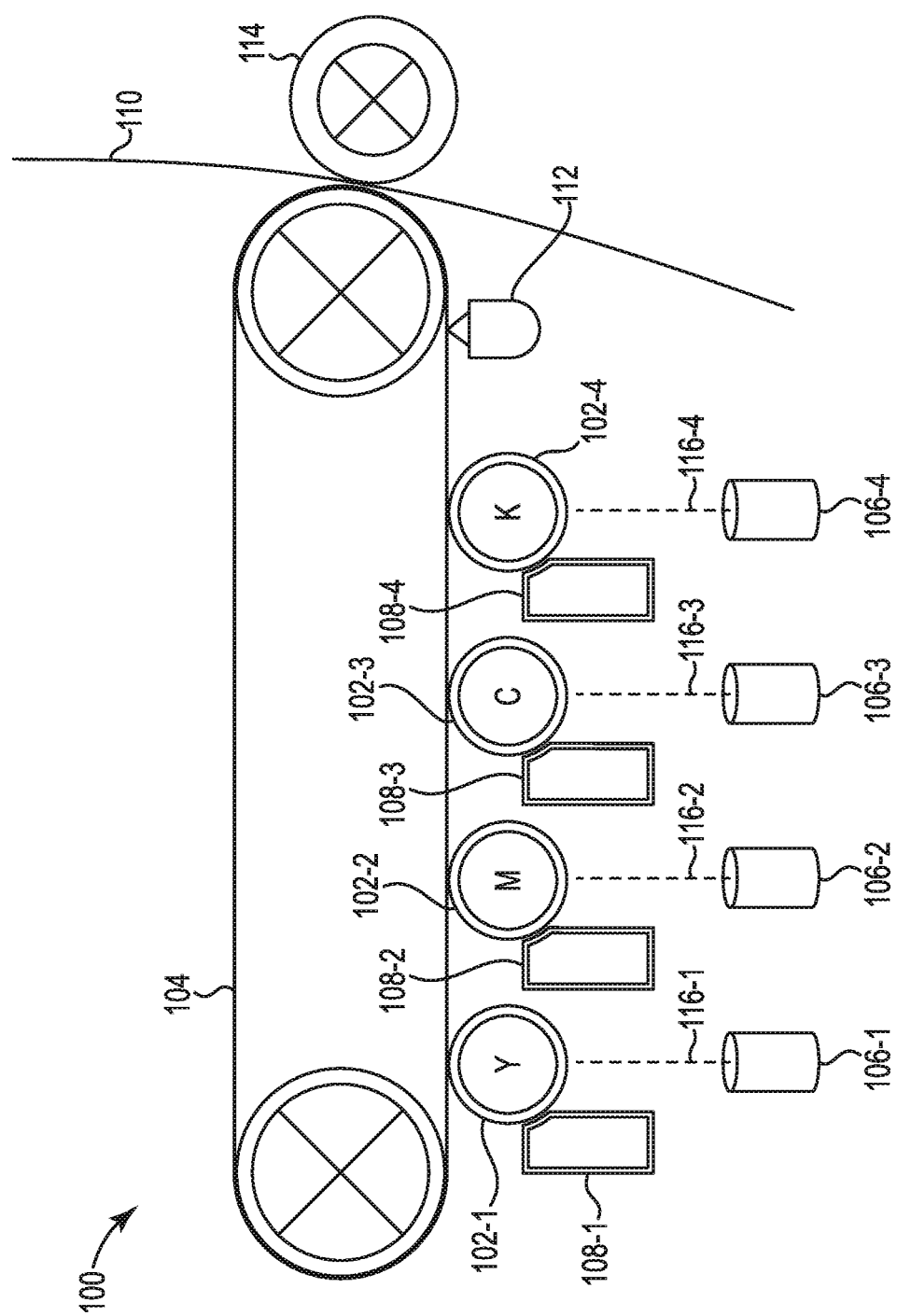
FIG. 1 illustrates a diagram of an example of a printing system including imaging drums, an intermediate transfer belt (ITB), diodes, print material developers, a print medium, and a density sensor consistent with the disclosure.

A printing system can include a printing component to which print material is delivered before being transferred to a print medium. Calibration procedures can be performed on printing systems to facilitate transfer of print material to print media. The calibration procedures can be used to, for example, detect print material density abnormalities of print material delivered to the printing component that is to be transferred to the print medium. A notification, including details about the print material density abnormalities, can be provided. As used herein, "a printing system" can include a printer, a copier, and/or a fax machine, among other possible print systems. As used herein, "a printing component" can include an imaging drum, and/or an intermediate transfer belt (ITB), among other possible printing components. In some examples, the printing system includes a singular printing drum. In some examples, the printing system includes a plurality of printing drums. In some examples, the printing system includes a singular ITB. In some examples, the printing system includes a plurality of ITBs. As used herein, "print media" can include paper and/or plastic, among other possible print media. As used herein, "print material" can include ink, toner, and/or powders, among other possible print materials.

"Print material density", as used herein, refers to a density of print material delivered to the printing component and/or a print medium. Print material density can be measured on an image formed on the printing component. Alternatively, or additionally, print material density can be measured on an image formed on the print medium. Furthermore, print material density can be measured in a calibration image located on the printing component. Any area on the printing component is eligible to be the calibration image, the calibration image is not limited to a certain region of the printing component. The calibration image can also be referred to as a "calibration area". There can be a singular calibration image or a plurality of calibration images. The calibration image can be of a compound shape that includes a combination of features. As used herein, "compound shape" refers to a shape including an altering of parameters, such as an increase and/or decrease in height and/or width, among other parameters. For example, the calibration image of the compound shape can include at least two lines forming a right angle, such as an "L" shape, and a "cross" shape, among similar shapes. The calibration image can alternatively or additionally include a concave polygon. The calibration image can alternatively or additionally include a triangle. Furthermore, the calibration image can alternatively or additionally include a circle, such as an oval or an ellipse, among other similar circular shapes. The calibration image can include a plurality of different shapes and is not to be limited by the compound shapes described herein.

Equipment, such as a density sensor, coupled to the printing system can be utilized to measure various factors, including the print material density. The density sensor can comprise a single density sensor or a plurality of density sensors. In addition, the density sensors can measure the print material density during uses other than the calibration procedure. Furthermore, the density sensors can output a signal including data related to the print material density to a processing resource associated with the printing system. The output signal can comprise a single output signal or a plurality of output signals.

The processing resource can execute instructions stored on a memory resource associated with the printing system. The instructions to be executed can include a signal analysis circuitry. Alternatively, or in addition, the instructions to be executed can include a signal analysis firmware. As such, the term instructions can include hardware instructions, software instructions, and/or firmware instructions. Based on the output signal from the density sensor, including measured print material density on the calibration image, the signal analysis instructions can detect print material density abnormalities. The print material density abnormalities can occur when a change in the print material density occurs during a calibration procedure. Said differently, a print material density abnormality can occur when the print material density is not uniform during the calibration procedure.

Furthermore, alternatively or in addition, when performance of the calibration procedure begins, an initial print material density that occurs during a first delivery of print material to the printing component can be set as a point in a range of print material density values. Subsequently, when the print material density changes to be outside of the range of print material density values, a print material density abnormality can be determined. The change away from (outside of) the range of print material density values can exceed or fall below the range of print material density values to be deemed an abnormality. A print material density abnormality can be referred to as a failure or a soft failure.

A complete failure can occur when no print material is delivered to the printing area, thereby resulting in a complete lack of any print material density. A partial failure, soft failure, can occur when the print material delivered to the printing component includes print material density abnormalities. The print material density abnormalities can comprise the print material delivered to the printing component and/or the print medium not being uniform and/or not being within a range of print material density values. In other words, an image on the printing component and/or the print media may be too dark and/or too light in parts after delivery of the print material.

A reason for the failure, complete or partial, can be a decrease in a stability of a diode in the printing system. The diode activates a diode output that is responsible for producing coherent radiation on the printing component. The term "diode output" can include a laser beam. The produced coherent radiation attracts the print material to the printing component. When the diode changes in stability, the diode output changes as well, thereby changing the coherent radiation produced, and therefore, a change in attraction of the print material can occur. The stability of the diode refers to a level of stability of the diode output that is activated by the diode. For example, a diode output activated by an initial diode is more stable than a diode output activated by a diode with less stability than the initial diode. The more a diode output decreases in stability, the less constant the produced coherent radiation, and therefore the change in attraction of print material. The change in attraction of the print material can be what leads to the print material density abnormalities. For example, an abnormality detected in the calibration image of the printing component of a printing device can be caused by a decrease in stability of a diode coupled to the printing device. The diode responsible for activating the diode output that produces the coherent radiation that attracts print material can decrease in stability due to variance in power provided to the diode by a power supply. The decrease in stability of the diode is a non-limiting example and there may be other factors that cause the print material density abnormalities.

When an abnormality is detected, the processing resource can provide a notification about the abnormality. The notification can be provided to the printing system. The notification can be provided to a display device associated with the printing system. The notification can include a title of the printing device, a date of the print material density abnormalities detection, a time of the print material density abnormalities detection, and/or a magnitude of the print material density abnormalities, among other possible details. In addition, or alternatively, details regarding the abnormality can be stored and/or displayed on an error log associated with the printing system. In some examples, the error log can be viewed on the display device mentioned above. The error log can alternatively, or additionally, be analyzed through access of a server. In some examples, the error log can alternatively, or additionally, be analyzed on a report including details of the calibration procedure provided on a print medium. In addition, or alternatively, the error log can be analyzed in other views not described herein.

In short, as a non-limiting example, a printing system can include a diode. When stability of the diode changes, a diode output activated by the diode can change as well. The diode output, when activated, can produce a coherent radiation that can attract print material to a printing component included in the printing system. When the diode output changes, the produced coherent radiation can change as well. The attraction of print material to the printing component can change as a result of the diode output changing. The change in attraction of the print material to the printing component can result in a change in density of print material delivered to the printing component. Density sensors coupled to the printing system can measure the density of print material, and signal analysis instructions, included in executable instructions relating to a calibration procedure for the printing system, can lead to detection of the change in density of print material. The change in density during a calibration procedure is a print material density abnormality. As such, due to the detection of the print material density abnormality, a failure of the printing system, caused by the change in stability of the diode, can also be detected. As stated below, the compound shapes included in the calibration image are a reason that the print material density abnormalities, and therefore a failure, can be detected.

FIG. 1 illustrates a diagram of an example of a printing system 100 including imaging drums 102-1, 102-2, 102-3, and 102-4, an intermediate transfer belt (ITB) 104, diodes 106-1, 106-2, 106-3, and 106-4, print material developers 108-1, 108-2, 108-3, and 108-4, a print medium 110, and a density sensor 112 consistent with the disclosure. The printing system 100 can perform a calibration procedure to facilitate a transfer of the print material from the print material developers 108-1, 108-2, 108-3, and 108-4 to the ITB 104. In addition, the calibration procedure can facilitate the transfer of print material to the print medium 110.

The calibration procedure can include detecting abnormalities in the printing system 100 and providing notifications relating to the detected abnormalities. When performing the calibration procedure, the printing system 100 delivers the print material from the print material developers 108-1, 108-2, 108-3, and 108-4 to a calibration image of a printing component. The print material developers 108-1, 108-2, 108-3, and 108-4 are intended as a non-limiting example of a way to transfer a color of print material. Print material can be stored in the print material developers 108-1, 108-2, 108-3, and 108-4. Alternatively, or in addition, print material can be stored elsewhere. Print material can be delivered to the printing component through the print material developers 108-1, 108-2, 108-3, and 108-4. Alternatively, or in addition, print material can be delivered to the printing component through another way of delivery that is associated with the printing system 100. Imaging drums 102-1, 102-2, 102-3, and 102-4 can be classified as a printing component. Additionally, or alternatively, an ITB 104 can be classified as a printing component. For example, in a monochromatic laser printer, the calibration procedure can be performed on the imaging drums 102-1, 102-2, 102-3, and 102-4.

Furthermore, the example of FIG. 1 includes a transfer roller 114 to facilitate transfer of print material to the print medium 110. In addition, the transfer roller 114 facilitates progression of the print medium 110 through the printing system 100. In some examples, the transfer roll 114 can be replaced with another way of facilitating the transfer of print material to the print medium 110 and/or a progression of the print medium 110 through the printing system 100.

During a calibration procedure, the diodes 106-1, 106-2, 106-3, and 106-4 can activate separate laser beams 116-1, 116-2, 116-3, and 116-4, respectively, that can produce coherent radiation on the printing component to which the print material from the print material developers 108-1, 108-2, 108-3, and 108-4 is delivered. In some examples, the diodes 106-1, 106-2, 106-3, and 106-4 can be laser diodes.

Figure 3:
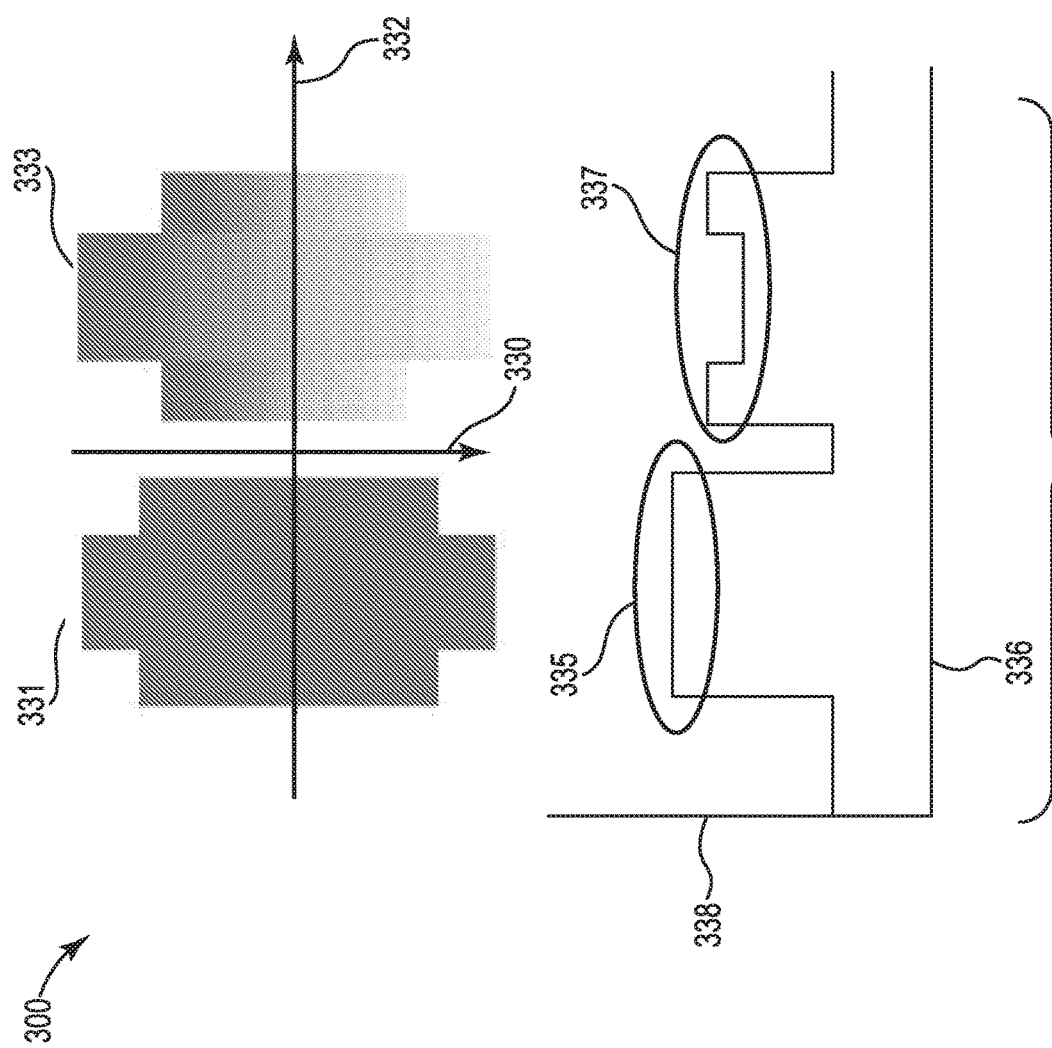
FIG. 3 illustrates a diagram of an example of a calibration procedure performed on a first calibration image and a second calibration image consistent with the disclosure.
Figure 4:
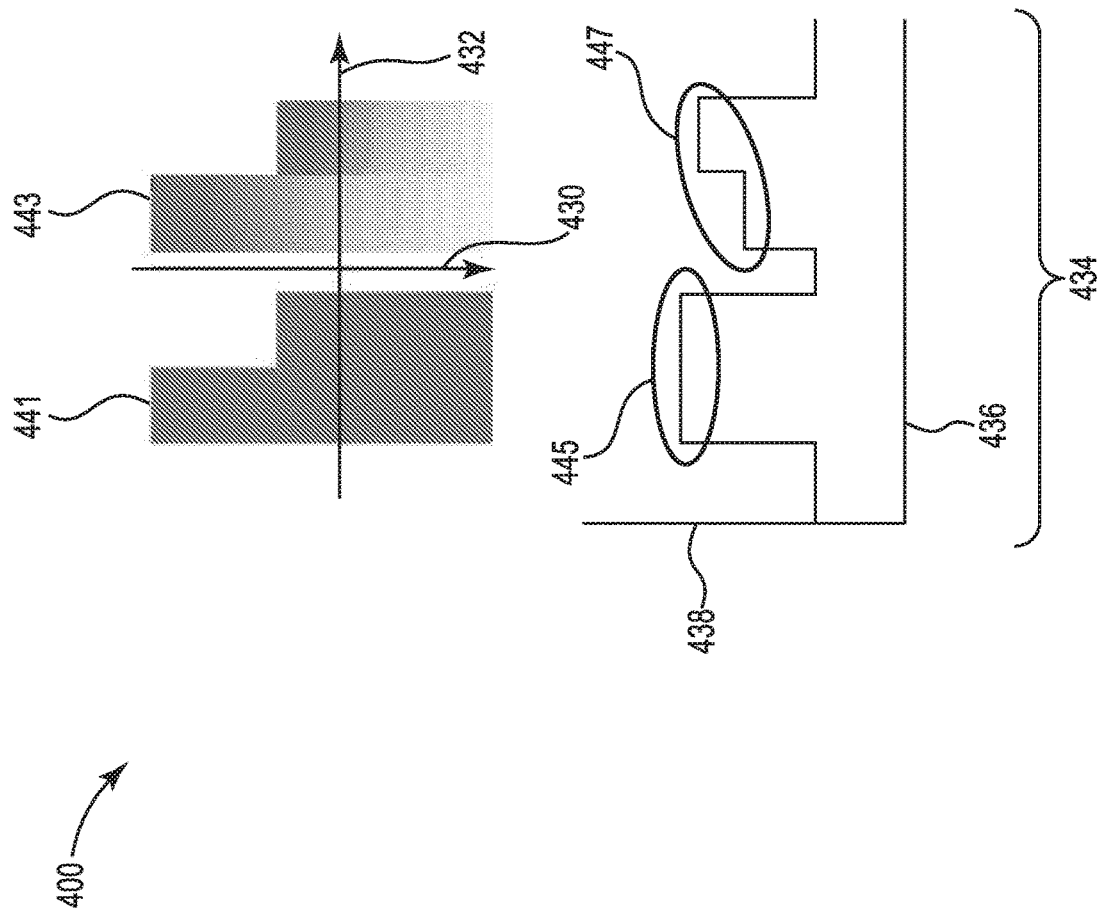
FIG. 4 illustrates a diagram of an example of a calibration procedure performed on a first calibration image and a second calibration image consistent with the disclosure.
Figure 5:
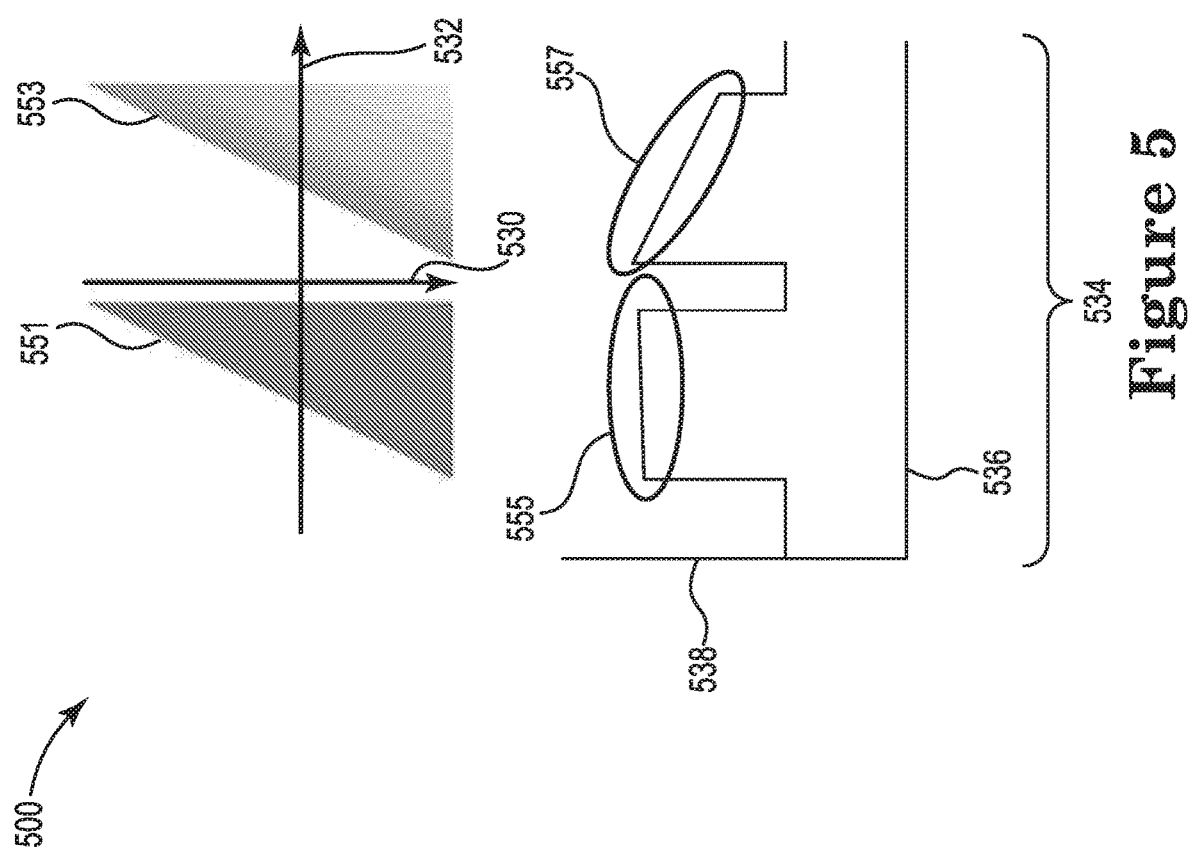
FIG. 5 illustrates a diagram of an example of a calibration procedure performed on a first calibration image and a second calibration image consistent with the disclosure.

The calibration image can include a compound shape (shown in FIGS. 3-5). The compound shape can have various features. For example, the compound shape can have two perpendicular lines that make a right angle. Alternatively, or in addition, the compound shape can include a cross figure. The compound shape can also be comprised of multiple shapes. A plurality of compound shapes can be utilized during the calibration procedure. In addition, the calibration image can be a plurality of calibration images. Each calibration image can be of a different size from other calibration images.

When there is a plurality of compound shapes, each compound shape can be of a different size than other compound shapes on the calibration image. As such, there can be one calibration image with one compound shape or there can be a plurality of calibration images of different sizes with a plurality of compound shapes of different sizes. The compound shapes in the plurality of compound shapes can all be of a same shape, can all be of a different shape, or some combination thereof. FIGS. 3-5 provide examples of compound shapes that can be used for the calibration procedure.

The density sensor 112 coupled to the printing system 100 can measure a density of the print material from the print material developers 108-1, 108-2, 108-3, and 108-4 that is delivered to the printing component. In the example of FIG. 1, the density sensor 112 can measure the print material density on the compound shape in the calibration image of the ITB 104. In different examples, the density sensor 112 can measure print material density on the calibration images on the imaging drums 102-1, 102-2, 102-3, and 102-4, or the print medium 110. Furthermore, in some examples, the density sensor 112 may measure print material density on the calibration images on only one or a number less than all of the imaging drums 102-1, 102-2, 102-3, and 102-4 present in the printing system 100. For example, in the case of monochrome printing devices, a density sensor can measure print material density on the calibration images on the imaging drum.

Signal analysis instructions can detect print material density abnormalities based on an output signal from the density sensor 112 including data from the measuring of the print material density of the print material from the print material developers 108-1, 108-2, 108-3, and 108-4. The print material density abnormality can be determined to have occurred when the print material density is not uniform or changes away from a range of print material density values during the calibration procedure.

When the signal analysis instructions detect the print material density abnormality, a notification can be sent to a display device (not shown). The display device can be included in the printing system 100. Alternatively, or in addition, the display device can be associated with the printing system 100. When the signal analysis instructions provide the notification to the display device, details such as a title of the printing system, a date of the print material density abnormality detection, a time of the print material abnormality detection, a magnitude of the abnormality, an error log concerning the print material density abnormality, and other such informative details can be presented on the display device.

In some examples, a print material can be of a color from among yellow, magenta, cyan, and black. As can be seen in FIG. 1, print material developer 108-1 provides the color yellow, the print material developer 108-2 provides the color magenta, the print material developer 108-3 provides the color cyan, and the print material developer 108-4 provides the color black.

In some examples, the printing system 100 can be a monochromatic printer. In a monochromatic printer, there is only one print material developer 108-4 and the color the print material developer 108-4 provides is black. As stated above, in other printing systems, the print material can be of colors that are different than cyan, magenta, yellow, and black. For example, the color of the print material can be red, or blue, among other colors. Each print material of a plurality of print materials can be directed to a different calibration image and/or a same calibration image on the printing component.

Figure 2:
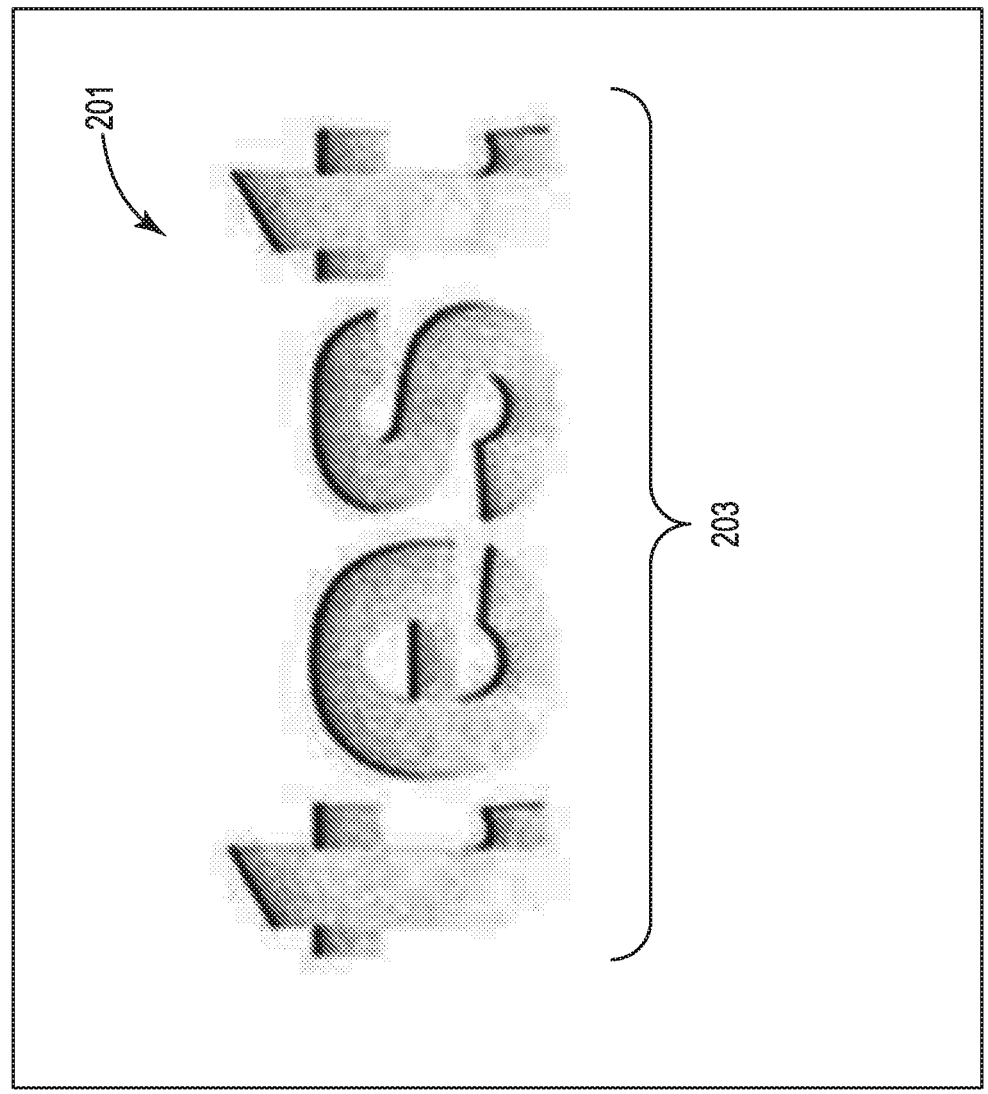
FIG. 2 illustrates a diagram of an example of an image on a printing component included in a printing system consistent with the disclosure.

FIG. 2 illustrates a diagram of an example of an image 203 on a printing component 201 included in a printing system 200 consistent with the disclosure. FIG. 2 displays print material density abnormalities that occur in the printing system 200 as print material from a print material developer (shown as 108-1, 108-2, 108-3, and 108-4 in FIG. 1) is delivered to the printing component 201. In other words, FIG. 2 shows that print material density can change (not be uniform) within the image 203 during the calibration procedure or during normal printing operation.

The print material density abnormalities (changes) can be based on a position of a calibration image. In other words, the print material density can be based on a length of scan of a laser beam in a direction. As used herein, a scan can be referred to as a scan line and can describe a sweep of the laser beam. The scan can describe a sweep of the laser beam in a direction perpendicular to a direction of ITB movement. An image can be constructed using multiple scans. A length of a scan of the laser beam can be described as a feature of the image and/or the calibration image. The print material density at the start of an individual scan line can be greater than the density at the end of the individual scan line in a given direction. The "start" of the individual scan line is intended to refer to a position of the printing component where print material is to begin being delivered on the printing component and the "end" of the individual scan line is intended to refer to a position where delivery of the print material on the printing component is to terminate.

A scan line can comprise the scan of the laser beam across a direction of the printing component. The scan of the laser beam can be where print material is delivered and as a result, an image can be built one scan line at a time. The scan line can be made possible because of a rotating mirror, which allows the laser beam to scan across the printing component. When considering an individual scan line, the laser beam may be activated and deactivated a number of times during the same single scan. As a result, print material may be delivered to the printing component for portions of a single scan line.

A reason that the position of the laser beam and individual scan lines is mentioned is because when a failure in a printing system occurs, a diode may be the cause. The diode may cause the failure by decreasing in stability. The decreased stability of the diode can result in a laser beam that is unstable and therefore decreases and/or increases production of coherent radiation on the printing component. Due to the decreased production of coherent radiation, a decrease in attraction of print material to the printing component can occur. This decreased attraction is what results in a decreased print material density. When the print material density is not uniform or becomes exterior to the range of print material density values, a print material abnormality is detected and, as a result of the abnormality detection, the failure can be detected as well.

As displayed in FIG. 2, the image 203 contains portions with a greater print material density relative to other portions. As the laser beam forms the image 203, the laser beam is made active at a start of each portion and made inactive at an end of each portion. FIG. 2 displays that a single word, even a single letter, can have multiple portions of different sizes. For example, the letter "t" has a portion that is vertically longer when compared to other portions, and the letter "t" has a portion that is horizontally larger when compared to other portions. The vertically longer portion of the letter "t" can cause the laser beam to be active for longer before reaching the end of the vertically longer portion. As a result, as FIG. 2 displays in the image 203 present on the printing component 201, the lengthier the image feature is on the printing component 201, the lengthier the activation time of the diode producing coherent radiation on the printing component 201 to attract print material, the more the stability of the diode can decrease, and thereby cause a decrease in attraction of print material to the printing component 201. For example, for the letter "t", print material density can be greater in portions that are vertically shorter than other portions. In other words, the vertically longer part of the "t" can attract less print material due to a decrease in the stability of the diode and therefore, a decrease in stability of the laser beam. As described further below, compound shapes included in calibration images on the printing component during calibration procedures allow the detection of the print material density abnormality.

FIG. 3 illustrates a diagram of an example of a calibration procedure 300 performed on a first calibration image 331 and a second calibration image 333 consistent with the disclosure. In the example of FIG. 3, the first calibration image 331 and the second calibration image 333 are of the same shape. A stability of a diode (shown as 106-1, 106-2, 106-3, and 106-4 in FIG. 1) used to create the first calibration image 331 and the second calibration image 333 is different between the first calibration image 331 and second calibration image 333. The stability of the diode responsible for creating the first calibration image 331 is greater than the stability of the diode responsible for creating the second calibration image 333. A laser beam (shown as 116-1, 116-2, 116-3, and 116-4 in FIG. 1), producing coherent radiation, is displayed as progressing in a first direction 330 on a printing component (shown as 201 in FIG. 2, 601 in FIG. 6, and 701 in FIG. 7).

A print material density measurement based on the print material attracted to the printing component is displayed as progressing in a second direction 332. Measurement of print material density is performed by a density sensor (shown as 112 in FIG. 1). The first direction 330 and the second direction 332 can be the same as or different from each other. The first direction 330 and the second direction 332 can be vertical or horizontal. The first direction 330 and the second direction 332 can be perpendicular to each other. The first direction 330 and the second direction 332 can be parallel to each other. In addition, the first direction 330 and the second direction 332 can be angular. In the example of FIG. 3, print material density is measured as the density sensors scan the first calibration image 331 and the second calibration image 333 in the second direction 332. Print material density is measured based on a reflection capability of print material delivered to the printing component. In the example of FIG. 3, the print material delivered to the printing component may have a greater diffuse reflection capability than the printing component itself. In other words, the print material delivered to the printing component may scatter more light than the printing component.

Furthermore, the example of FIG. 3 contains a graph 334 that displays a relationship between a position on the calibration image 336 (x-axis) and a print material density 338 (y-axis) of the compound shape at the position. Based on the graph 334 for the first calibration image 331, the measured print material density 335 remains constant when the stability of the diode used for the first calibration image 331 remains constant despite any changes in the position on the calibration image 336. This is different for the second calibration image 333 where the measured print material density changes 337 based on the position on the calibration image 336.

For example, in FIG. 3, when the stability of the diode used for the second calibration image 333 is decreased, the measured print material density 337 decreases as well at certain positions. The certain positions correspond to geometric features on the compound shape. As such, when positions on the calibration image 336 are analyzed for a measurement of print material density 337, the print material density can be dependent on how long after the start of the laser beam activation the laser beam remains activated. In other words, when a position on the calibration image 336 is analyzed after a relatively longer activation of the laser beam on the printing component, the greater the decrease in print material density when compared to other positions. For example, when the laser beam is activated for vertically longer portions of the compound shape included in the second calibration image 333, the greater the decrease in measured print material density 337. As such, the measured print material density 337 changes for the second calibration image 333, and therefore, the measured print material density 337 is not uniform or within a set range of print material density values for the second calibration image 333.

The reason the measured print material density 337 changes can be detected is the cross figure included in the compound shape of the first calibration image 331 and the second calibration image 333. Due to the differences of the length of the laser beam activation within the first calibration image 331 and the second calibration image 333, the changed stability of the diode responsible for the second calibration image 333 can be detected based on the changing measured print material density 337 in the second calibration image 333. In other words, as stated above, altering parameters of the compound shape included in the second calibration image 333 utilized during the calibration procedure allows for detection of print material density abnormalities. Because the parameters are altered, print material density at different positions across the compound shape can be compared to each other and thereby reveal changes. As such, a print material density abnormality can be detected, and therefore, a failure as well.

FIG. 4 illustrates a diagram of an example of a calibration procedure 400 performed on a first calibration image 441 and a second calibration image 443 consistent with the disclosure. In the example of FIG. 4, the first calibration image 441 and the second calibration image are of the same shape. A stability of a diode (shown as 106-1, 106-2, 106-3, and 106-4 in FIG. 1) used to create the first calibration image 441 and the second calibration image 443 is different between the first calibration image 441 and the second calibration image 443. The stability of the diode responsible for creating the first calibration image 441 is greater than the stability of the diode responsible for creating the second calibration image 443. A laser beam (shown as 116-1, 116-2, 116-3, and 116-4 in FIG. 1), producing coherent radiation, is displayed as moving in a first direction 430 on a printing component (shown as 201 in FIG. 2, 701 in FIG. 7, and 801 in FIG. 8).

A print material density measurement based on the print material attracted to the printing component is displayed as progressing in a second direction 432. Measurement of print material density is performed by a density sensor (shown as 112 in FIG. 1). The first direction 430 and the second direction 432 can be the same as or different from each other. The first direction 430 and the second direction 442 can be vertical or horizontal. The first direction 430 and the second direction 432 can be perpendicular to each other. The first direction 430 and the second direction 432 can be parallel to each other. In addition, the first direction 430 and the second direction 442 can be angular. In the example of FIG. 4, print material density is measured as the density sensors scan the first calibration image 441 and the second calibration image 443 in the second direction 432. Print material density is measured based on a reflection capability of print material delivered to the printing component. In the example of FIG. 4, the print material delivered to the printing component may have a greater diffuse reflection capability than the printing component itself. In other words, the print material delivered to the printing component may scatter more light than the printing component.

Furthermore, the example of FIG. 4 contains a graph 434 that displays a relationship between a position on the calibration image 436 (x-axis) and a measured print material density 438 (y-axis) of the compound shape at the position. Based on the graph 434 for the first calibration image 441, the measured print material density 447 remains constant when the stability of the diode used for the first calibration image 441 remains constant despite any changes in the position on the calibration image 436. This is different for the second calibration image 443 where the measured print material density changes 447 based on the position on the calibration image 436.

For example, in FIG. 4, when the stability of the diode used for the second calibration image 443 is decreased, the measured print material density 438 decreases as well at certain positions. The certain positions correspond to geometric features on the compound shape. As such, when the position on the calibration image 436 is analyzed for a measurement of print material density 447, the print material density can be dependent on how long after the start of the laser beam activation the laser beam remains activated.

For example, when the laser beam is activated for vertically longer portions of the compound shape of the second calibration image 443, those vertically longer portions can have lower measured print material densities 447. As such, the measured print material density 447 changes at the transition between the vertically longer portion and the vertically shorter portion. In other words, when a position of the laser beam on the calibration image 436 is analyzed after a relatively longer activation of the laser beam on the printing component, the greater the decrease in print material density when compared to other positions. Therefore, the measured print material density 447 is not uniform for the second calibration image 443, and as a result, a print material density abnormality is detected.

The reason the measured print material density 447 changes can be detected is the two lines forming a right angle included in the compound shape of the first calibration image 441 and the second calibration image 443. Due to the differences of the length of the laser beam activation within the first calibration image 441 and the second calibration image 443, the changed stability of the diode responsible for the second calibration image 443 can be detected based on the changing measured print material density 447 in the second calibration image 443. In other words, as stated above, altering parameters of the compound shape included in the second calibration image 443 utilized during the calibration procedure allows for detection of change in print material density abnormalities. Because the parameters are altered, portions of the compound shape can be compared to each other and thereby reveal changes. As such, a print material density abnormality can be detected, and therefore, a failure as well.

FIG. 5 illustrates a diagram of an example of a calibration procedure 500 performed on a first calibration image 551 and a second calibration image 553 consistent with the disclosure. In the example of FIG. 5, the first calibration image 551 and the second calibration image are of the same shape. A stability of a diode (shown as 106-1, 106-2, 106-3, and 106-4 in FIG. 1) used to create the first calibration image 551 and the second calibration image 553 is different between the first calibration image 551 and second calibration image 553. The stability of the diode responsible for creating the first calibration image 551 is greater than the stability of the diode responsible for creating the second calibration image 553. A laser beam (shown as 116-1, 116-2, 116-3, and 116-4 in FIG. 1), producing coherent radiation, is displayed as moving in a first direction 530 on a printing component (shown as 201 in FIG. 2, 601 in FIG. 6, and 701 in FIG. 7).

A print material density measurement based on the print material attracted to the printing component is displayed as progressing in a second direction 532. Measurement of print material density is performed by a density sensor (shown as 112 in FIG. 1). The first direction 530 and the second direction 532 can be the same as or different from each other. The first direction 530 and the second direction 532 can be vertical or horizontal. The first direction 530 and the second direction 532 can be perpendicular to each other. The first direction 530 and the second direction 532 can be parallel to each other. In addition, the first direction 530 and the second direction 532 can be angular. In the example of FIG. 5, print material density is measured as the density sensors scan the first calibration image 551 and the second calibration image 553 in the second direction 532. Print material density is measured based on a reflection capability of print material delivered to the printing component. In the example of FIG. 5, the print material delivered to the printing component may have a greater diffuse reflection capability than the printing component itself. In other words, the print material delivered to the printing component may scatter more light than the printing component.

Furthermore, the example of FIG. 5 contains a graph 534 that displays a relationship between a position of the laser beam on the calibration image 536 (x-axis) and a measured print material density 538 (y-axis) of the compound shape at the position. Based on the graph 534 for the first calibration image 551, the measured print material density 555 remains constant when the stability of the diode used for the first calibration image 551 remains constant despite any changes in the position of the laser beam on the calibration image 536. This is different for the second calibration image 553 where the measured print material density 557 changes based on the position on the calibration image 536.

For example, in FIG. 5, when the stability of the diode used for the second calibration image 553 is decreased, the measured print material density 557 decreases as well when the calibration image 536 is analyzed at certain positions.

The certain positions correspond to geometric features on the compound shape. As such, when the position on the calibration image 536 is analyzed for a measurement of print material density 557, the print material density can be dependent on how long after the start of the laser beam activation the laser beam remains activated. In other words, when a position on the calibration image 536 is analyzed after a relatively longer activation of the laser beam on the printing component, the greater the decrease in print material density when compared to other positions.

For example, when the laser beam is activated for vertically longer portions of the compound shape included in the second calibration image 553, the greater the decrease in measured print material density 557. As such, the measured print material density 557 changes for the second calibration image 553, and therefore, the measured print material density 557 is not uniform for the second calibration image 553.

The reason the measured print material density 557 changes can be detected is the triangle included in the compound shape of the first calibration image 551 and the second calibration image 553. Due to the differences of the length of the laser beam activation within the first calibration image 551 and the second calibration image 553, the changed stability of the diode responsible for the second calibration image 553 can be detected based on the changing measured print material density 557 in the second calibration image 553. In other words, as stated above, altering parameters of the compound shape included in the second calibration image 553 utilized during the calibration procedure allows for detection of changes in print material density. Because the parameters are altered, portions of the compound shape can be compared to each other and thereby reveal changes. As such, a print material density abnormality can be detected, and therefore, a failure as well. Furthermore, in addition to, or alternative to, the compound shapes displayed in FIGS. 3, 4, and 6, compound shapes such as an oval, an ellipse, and a variety of others not disclosed herein may be included in a calibration image or a plurality of calibration images.

Figure 6:
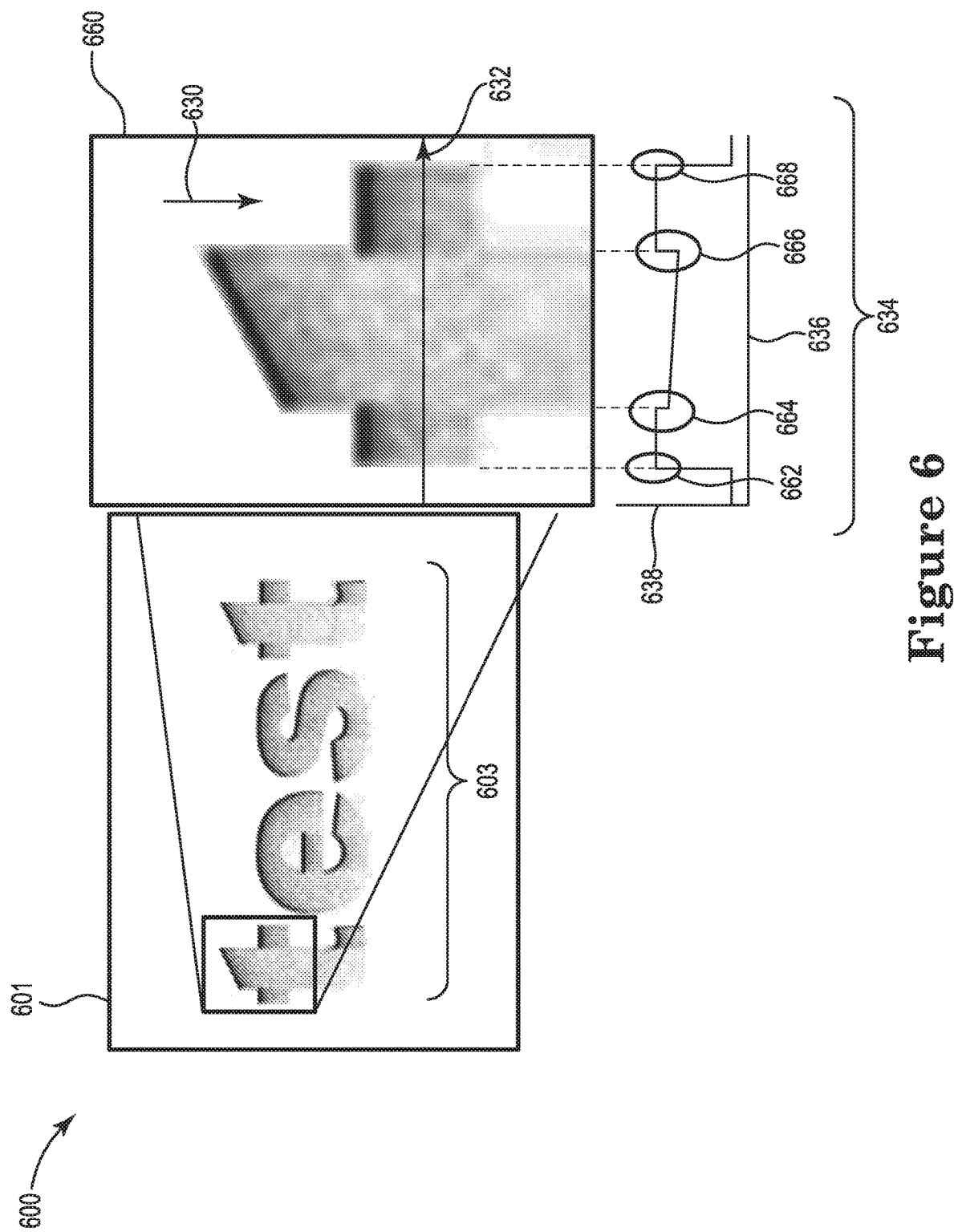
FIG. 6 illustrates a diagram of an example of a calibration procedure performed on a portion of a calibration image on a printing component consistent with the disclosure.

FIG. 6 illustrates a diagram of an example of a calibration procedure 600 performed on a portion of a calibration image 660 on a printing component 601 consistent with the disclosure. In FIG. 6, the portion of the calibration image 660 is a magnified section of an image 603 on the printing component 601. A laser beam (shown as 116-1, 116-2, 116-3, and 116-4 in FIG. 1), producing coherent radiation, progresses in a first direction 630 and causes creation of the image 603.

A print material density measurement based on the print material attracted to the printing component is displayed as progressing in a second direction 632. The measurement is performed by a density sensor (shown as 112 in FIG. 1). The first direction 630 and the second direction 632 can be different from each other. The first direction 630 and the second direction 632 can be vertical or horizontal. The first direction 630 and the second direction 632 can be perpendicular to each other. The first direction 630 and the second direction 632 can be parallel to each other. In addition, the first direction 630 and the second direction 632 can be angular. In the example of FIG. 6, print material density is measured as the density sensors scan the portion of the calibration image 660 in the second direction 632. Print material density is measured based on a reflection capability of print material delivered to the printing component. In the example of FIG. 6, the print material delivered to the printing component 601 may have a greater diffuse reflection capability than the printing component 601 itself. In other words, the print material delivered to the printing component 601 may scatter more light than the printing component 601. Example colors of print materials that can be used in the example of FIG. 6 are cyan, magenta, black, and yellow.

Furthermore, the example of FIG. 6 contains a graph 634 that displays a relationship between a position on the calibration image 636 (x-axis) and a print material density 638 (y-axis). The position on the calibration image 636 is reflective of a length the laser beam has been active on the printing component for. As such, when the position on the calibration image 636 is analyzed for a print material density 638, the measured print material density 662, 664, 666, and 668 can be dependent on how long after the start of the laser beam activation the laser beam remains activated. In other words, when a position on the calibration image 636 is analyzed after a relatively longer activation of the laser beam on the printing component, the greater the decrease in print material density when compared to other positions.

For example, when the laser beam is activated for vertically longer portions of the compound shape, the greater the decrease in measured print material density 662, 664, 666, and 668. As such, the measured print material density 664-666 changes, and therefore, the measured print material density 662, 664, 666, and 668 is not uniform for the calibration procedure. For example, when a laser scan distance is shorter 662-664 and 666-668 in comparison to when the laser scan distance is longer 664-666, the measured print material density is greater. In short, when the laser beam progresses for longer on the printing component 601, the greater the measured decrease in print material density. Due to the altering parameters of the compound shape, portions of the compound shape can be compared to each other and as such, a print material density abnormality can be detected.

Figure 7:
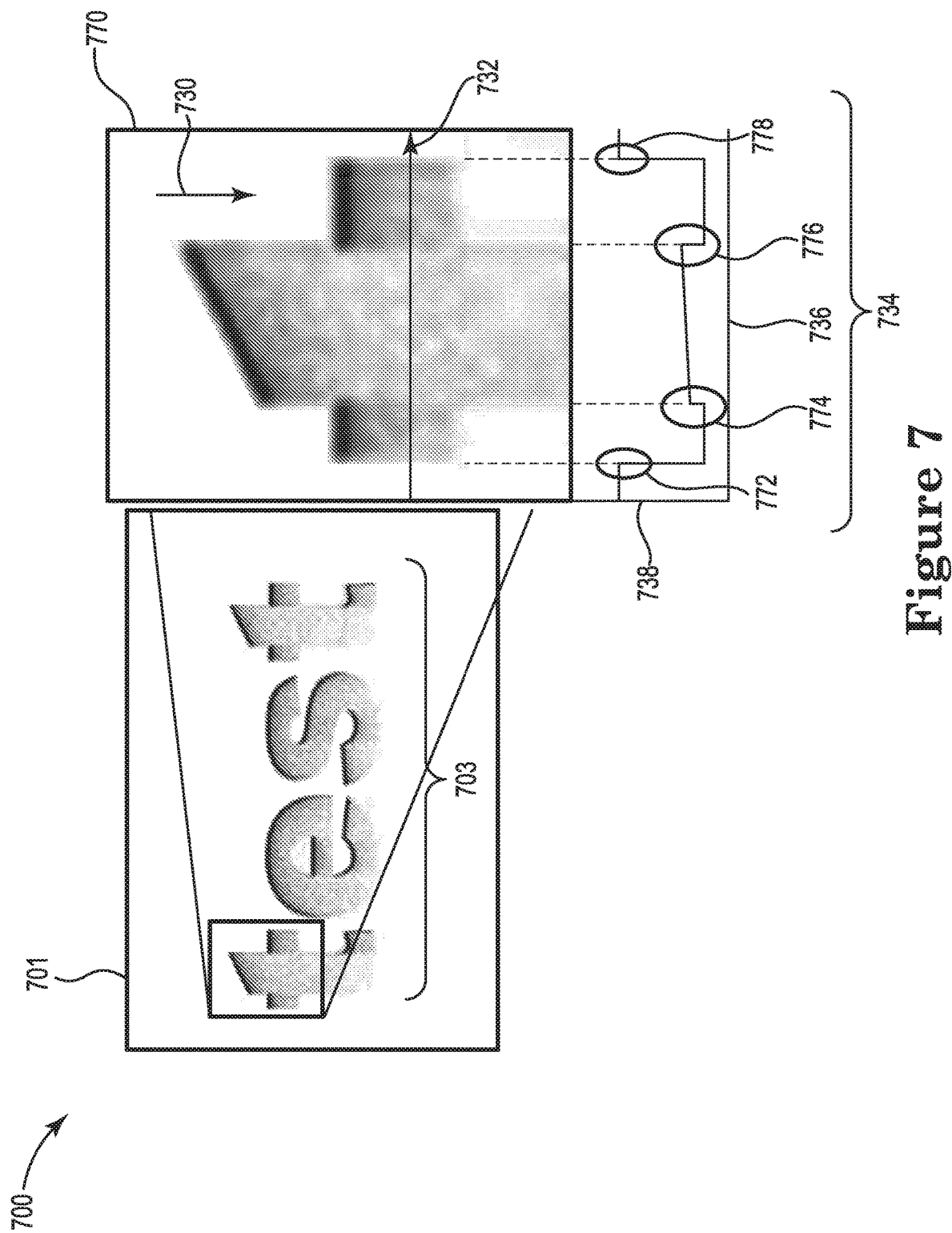
FIG. 7 illustrates a diagram of an example of a calibration procedure performed on a portion of a calibration image on a printing component consistent with the disclosure.

FIG. 7 illustrates a diagram of an example of a calibration procedure 700 performed on a portion of a calibration image 770 on a printing component 701 consistent with the disclosure. In FIG. 7, the portion of the calibration image 770 is a magnified section of an image 703 on the printing component 701. A laser beam (shown as 116-1, 116-2, 116-3, and 116-4 in FIG. 1), producing coherent radiation, progresses in a first direction 730 and causes creation of the image 703.

A measurement of print material density, based on the print material attracted to the printing component, progresses in a second direction 732. The measurement is performed by a density sensor (shown as 112 in FIG. 1). The first direction 730 and the second direction 732 can be different from each other. The first direction 730 and the second direction 732 can be vertical or horizontal. The first direction 730 and the second direction 732 can be perpendicular to each other. The first direction 730 and the second direction 732 can be parallel to each other. The first direction 730 and the second direction 732 can be angular. In the example of FIG. 7, print material density is measured as the density sensors analyze the portion of the calibration image 770 in the second direction 732.

Print material density of the print material used in the example of FIG. 7 is measured based on a specular (mirror-like) reflection capability of print material delivered to the printing component 701. In the example of FIG. 7, the print material delivered to the printing component 701 to form the image 703 has a lesser specular reflection capability than the printing component 701 itself. In other words, light directed upon the print material delivered to the printing component 701 is more absorbed and/or more diffusely reflected (scattered) than light directed upon non-imaged areas of the printing component 701 during the print material density measurement. As such, the measured print material density 738 is graphed as an inverse of the measured print material density 638 in the example of FIG. 6. A non-limiting example color of print material that can be used in the example of FIG. 7 is black.

The example of FIG. 7 contains a graph 734 that displays a relationship between a position on the calibration image 736 (x-axis) and a print material density 738 (y-axis). The position on the calibration image 736 is reflective of a length the laser beam has been active on the printing component for. As such, when the position on the calibration image 736 is analyzed for a print material density 738, the measured print material density 772, 774, 776, and 778 can be dependent on how long after the start of the laser beam activation the laser beam remains activated. In other words, when a position on the calibration image 736 is analyzed after a relatively longer activation of the laser beam on the printing component, the greater the decrease in print material density when compared to other positions.

For example, when the laser beam is activated for vertically longer portions of the compound shape, the greater the decrease in measured print material density 772, 774, 776, and 778. As such, the measured print material density 774-776 changes, and therefore, the measured print material density 772, 774, 776, and 778 is not uniform for the calibration procedure. For example, when a laser scan distance is shorter 772-774 and 776-778 in comparison to when the laser scan distance is longer 774-776, the measured print material density is greater. In short, when the laser beam progresses for longer on the printing component 701, the greater the measured decrease in print material density. Due to the altering parameters of the compound shape, portions of the compound shape can be compared to each other and as such, a print material density abnormality can be detected.

As stated above, because the print material used for FIG. 6 is greater in reflection capabilities than the print material used for FIG. 7, the graph 734 is the inverse of the graph 634. This difference can be disregarded because the relationship between measured print material density 638 and 738 and the length of the laser scan results in a clear density measurement signal in either case. As the examples presented in FIGS. 6 and 7 display, measured print material density 638 and 738 can have an inverse relation to the length of the laser scan, as reflected by the position on the calibration image 636 and 736 when analyzed. For example, as the length of the laser scan increases, the measured print material density 638 and 738 decreases. A non-uniformity during the calibration procedure is why the decrease in print material density can be detected as a print material density abnormality. The detection of the print material density abnormality can be used to determine a failure, complete or partial, in the printing system.

Figure 8:
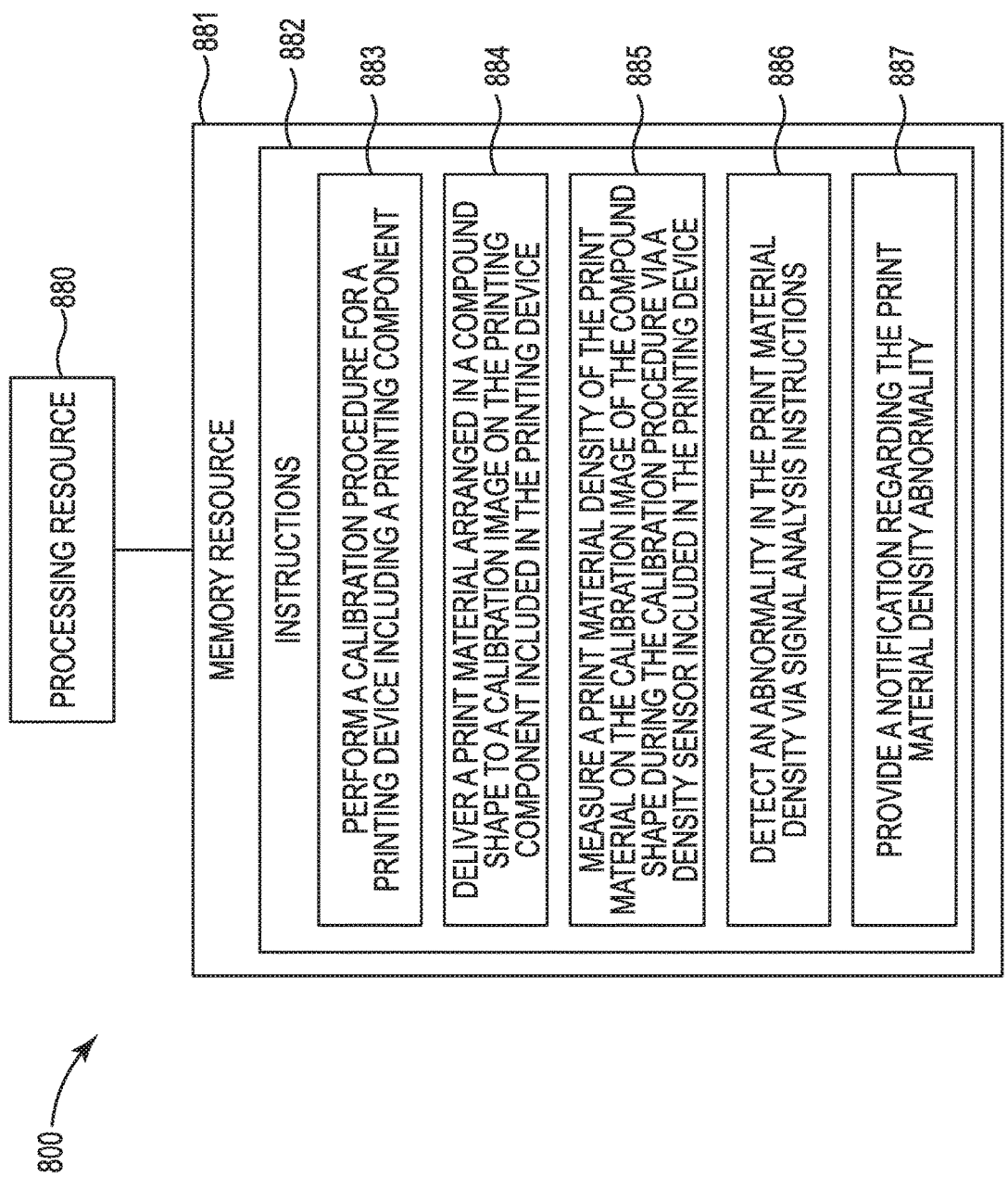
FIG. 8 illustrates an example of a system consistent with the disclosure.

FIG. 8 illustrates an example of a system consistent with the disclosure. As shown in FIG. 8, the system 800 includes a processing resource 880 and a memory resource 881.

The processing resource 880 may be a hardware processing unit such as a microprocessor, application specific instruction set processor, coprocessor, network processor, or similar hardware circuitry that can cause machine-readable instructions to be executed. In some examples, the processing resource 880 may be a plurality of hardware processing units that can cause machine-readable instructions to be executed. The processing resource 880 can include central processing units (CPUs) and/or graphics processing units (GPUs), among other types of processing units. The memory resource 881 may be any type of volatile or non-volatile memory or storage, such as random access memory (RAM), flash memory, read-only memory (ROM), storage volumes, a hard disk, or a combination thereof.

The memory resource 881 may store instructions 882 thereon. When executed by the processing resource 880, the instructions 882 may cause the system 800 to perform specific tasks and/or functions. For example, at block 883, the memory resource 881 may store instructions 882 which may be executed by the processing resource 880 to cause the system 800 to perform a calibration procedure for a printing device including a printing component. The calibration procedure can be utilized to facilitate transfer of print material to a calibration image and/or to print media. The calibration procedure can be used to, for example, detect print material density abnormalities of print material delivered to the printing component that is to be transferred to the print medium.

At block 884, the memory resource 881 may store instructions 882 which may be executed by the processing resource 880 to cause the system 800 to deliver a print material arranged in a compound shape to a calibration image on the printing component included in a printing device. The print system 800 can initiate delivery of the print material by utilizing a diode to produce a coherent radiation on a printing component which attracts print material. The printing component can be an imaging drum, among other printing components. The print material can then be transferred to an ITB, in some examples. In addition, the compound shape on the printing component can be from a group consisting of a cross figure, a concave polygon, at least two lines that form a right angle, an ellipse, and/or a triangle, among other such shapes.

At block 885, the memory resource 881 may store instructions 882 which may be executed by the processing resource 880 to cause the system 800 to measure a print material density of the calibration image of the compound shape during the calibration procedure via a density sensor. The print material density can be detected based on reflection capability of the print material.

At block 886, the memory resource 881 may store instructions 882 which may be executed by the processing resource 880 to cause the system 800 to detect an abnormality of the print material density via signal analysis instructions. The print material density abnormality can occur when the print material density changes during the calibration procedure. For example, the abnormality is detected when the print material density is not uniform during the calibration procedure. Alternatively, or in addition, the abnormality may be detected when the print material density changes away from a set range of print material density values. The change may comprise either exceeding the set range of print material density values or falling below the set range of print material density values.

At block 887, the memory resource 881 may store instructions 882 which may be executed by the processing resource 880 to cause the printing system 800 to provide a notification regarding the print material density responsive to a detection of the abnormality. In some examples, the notification can include a title of the printing device. In some examples, the notification can include a date of the print material density abnormality detection. In some examples, the notification can include a time of the print material density abnormality detection. In some examples, the notification can include a magnitude of the print material density abnormality. In addition, or alternatively, details regarding the print material density abnormality can be stored and/or displayed in an error log associated with the printing system.

In some examples, the signal analysis instructions can detect the abnormality of the print material density based on an output from the density sensor. The output from the density sensors can be based on such things as a position on a calibration image and a measured print material density (shown as 335 and 337 in FIGS. 3, 445 and 447 in FIGS. 4, 555 and 557 in FIGS. 5, 662, 664, 666, and 668 in FIG. 6, and 772, 774, 776, and 778 in FIG. 7). In some examples, the print material density can be measured on a print medium (shown as 110 in FIG. 1).

Figure 9:
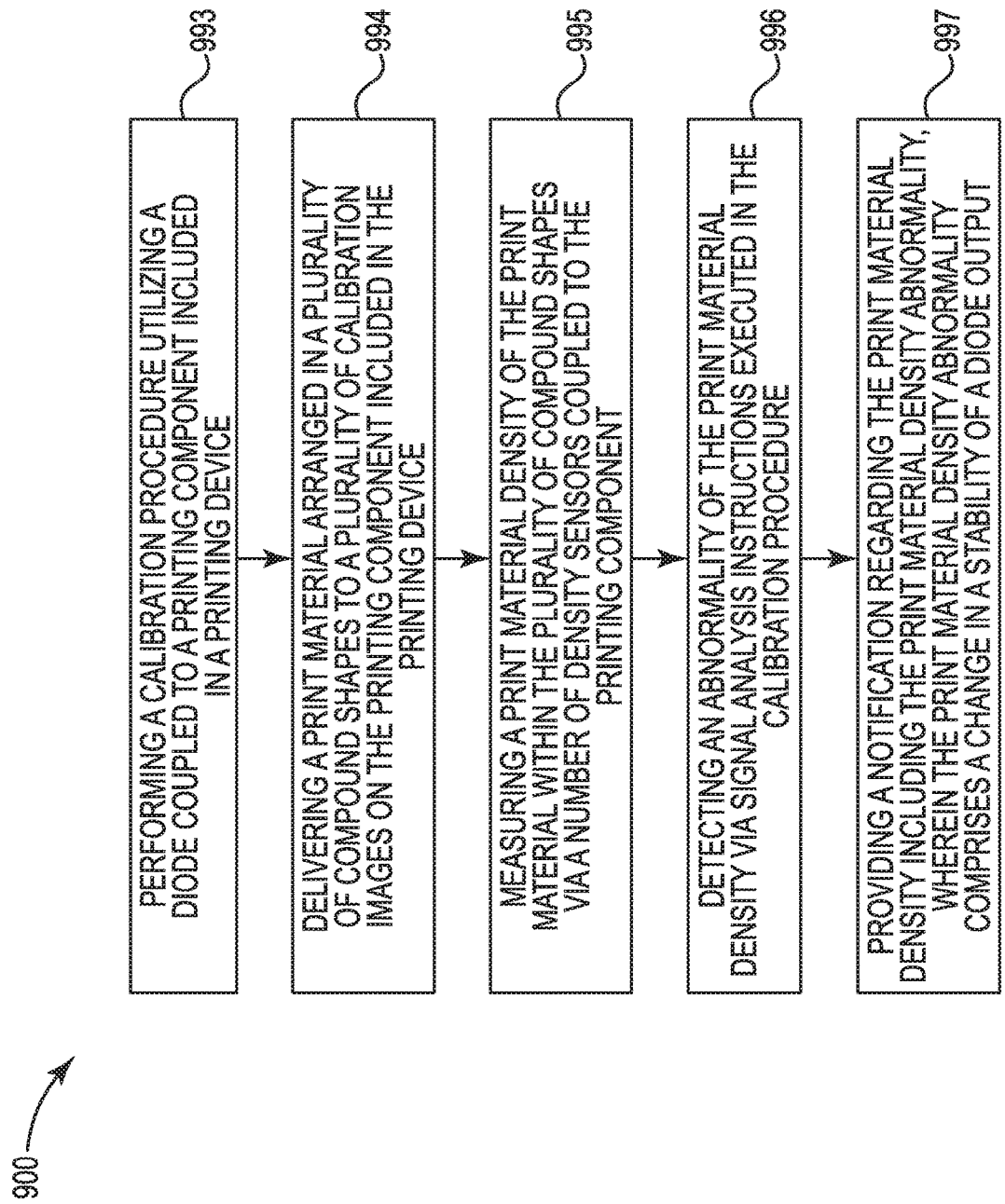
FIG. 9 illustrates an example flow diagram of a method consistent with the disclosure.

FIG. 9 illustrates an example flow diagram of a method 900 consistent with the disclosure. At block 993, the method can include performing a calibration procedure (shown as 600 in FIGS. 6 and 700 in FIG. 7) utilizing a diode (shown as 106-1, 106-2, 106-3, and 106-4 in FIG. 1) coupled to a printing component included in a printing device. In some examples, the printing device can be a laser printing device. In some examples, the diode can be a laser diode included in the laser printing device. The calibration procedure can be utilized to facilitate transfer of print material to a calibration image and/or to print media. The calibration procedure can be used to, for example, detect print material density abnormalities of print material delivered to the printing component that is to be transferred to the print medium.

At block 994, the method can include delivering a print material arranged in a plurality of compound shapes to a plurality of calibration images on the printing component included in the printing device. In some examples, the printing component can include an imaging drum and/or an ITB, among other printing components. In addition, the plurality of compound shapes on the printing component can include one of a cross figure, a concave polygon, at least two lines that form a right angle, and/or a triangle, among other such shapes. In some examples, the plurality of areas can include areas of different sizes.

At block 995, the method can include measuring a print material density of the print material within the plurality of compound shapes via a number of density sensors coupled to the printing component. The density sensors can utilize the reflection capabilities of the print material to make the measurement. The number of density sensors can comprise a single density sensor or a plurality of density sensors.

At block 996, the method can include detecting an abnormality of the print material density via signal analysis instructions executed in the calibration procedure. For example, the signal analysis instructions can be included in instructions related to the calibration procedure that are stored in firmware associated with the printing device. The print material density abnormality can occur when the print material density changes during the calibration procedure. In other words, the print material density is not uniform during the calibration procedure.

At block 997, the method can include providing a notification regarding the print material density including the print material density abnormality, wherein the print material density abnormality comprises a change in a stability of a diode output. In some examples, the change in the stability of the diode output is a decrease in the stability of the diode output. In some examples, the change in the stability of the diode output is an increase in the stability of the diode output.

Figure 10:
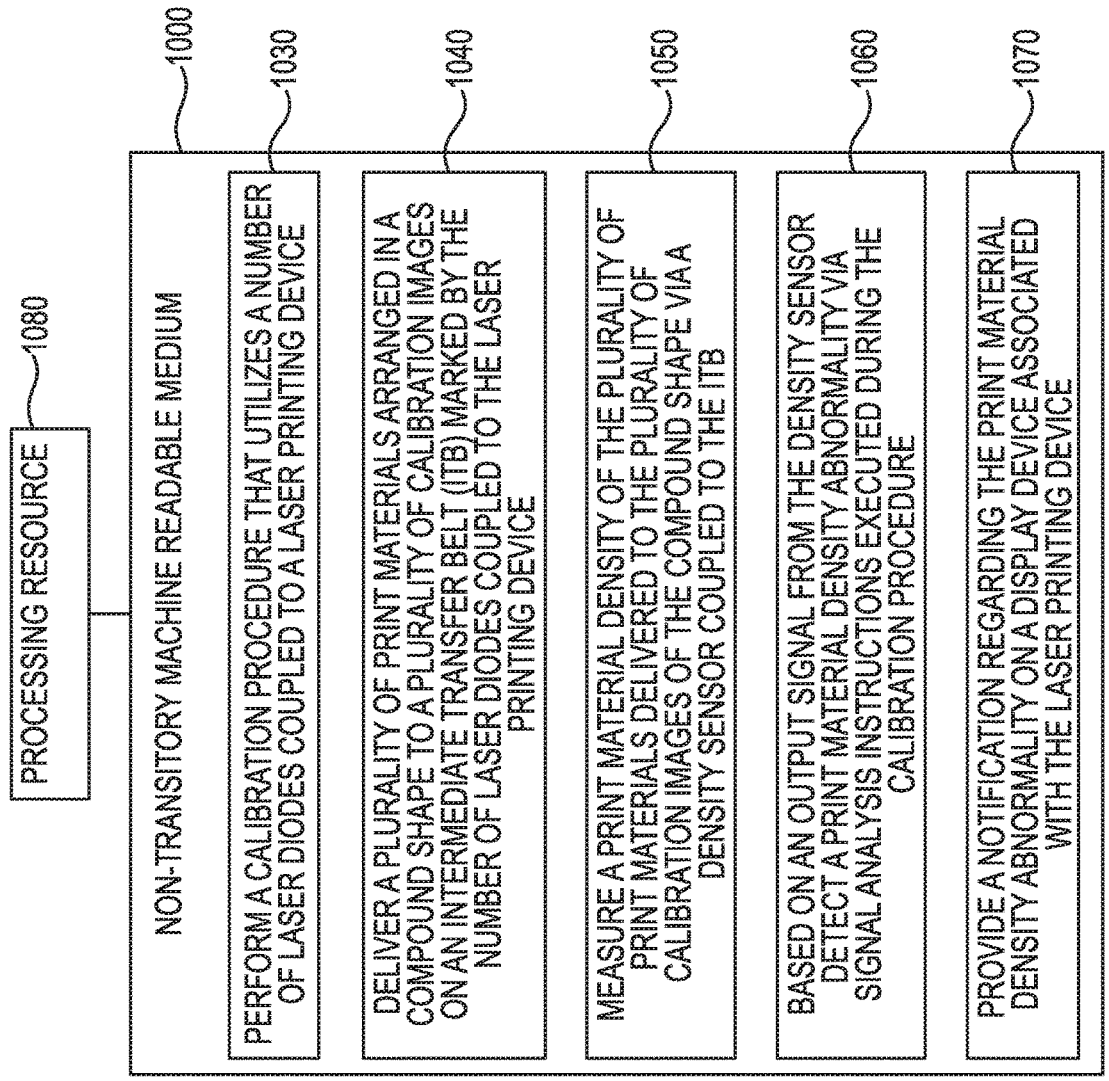
FIG. 10 illustrates an example non-transitory machine-readable medium consistent with the disclosure.

FIG. 10 illustrates an example non-transitory machine-readable medium 1000 consistent with the disclosure. A processing resource 1080 can execute instructions stored on the non-transitory machine-readable medium 1000. The processing resource 1080 can be a hardware processing unit such as a microprocessor, application specific instruction set processor, coprocessor, network processor, or similar hardware instructions that can cause machine-readable instructions to be executed. In some examples, the processing resource 1080 can be a plurality of hardware processing units that can cause machine-readable instructions to be executed. The processing resource 1080 can include central processor units (CPUs) and/or graphics processing units (GPUs), among other types of processing units. The non-transitory machine-readable medium 1000 can be any type of volatile or non-volatile memory or storage, such as random-access memory (RAM), flash memory, read-only memory (ROM), storage volumes, a hard disk, or a combination thereof.

The example medium 1000 stores instructions 1030 executable by the processing resource 1080 to perform a calibration procedure that utilizes a number of laser diodes coupled to a laser printing device. The calibration procedure can be utilized to facilitate transfer of print material to a calibration image on a printing component and/or on print media. The calibration procedure can be used to, for example, detect print material density abnormalities of print material delivered to the printing component that is to be transferred to the print medium.

The example medium 1000 stores instructions 1040 executable by the processing resource 1080 to deliver a plurality of print materials arranged in a compound shape to a plurality of calibration images on an intermediate transfer belt (ITB) (shown as 104 in FIG. 1) marked by the number of laser diodes coupled to the laser printing device. In some examples, each of the plurality of print materials comprises a different color of cyan, magenta, yellow, and black. For monochromatic printing systems, an imaging drum, without an ITB, can be utilized for a plurality of calibration images for delivery of the plurality of print materials.

The example medium 1000 stores instructions 1050 executable by the processing resource 1080 to measure a print material density of the plurality of print materials delivered to the plurality of calibration images of the compound shape via a density sensor coupled to the ITB.

The example medium 1000 stores instructions 1060 executable by the processing resource 1080 to, based on an output signal from the density sensor, detect an abnormality of the print material density via signal analysis instructions executed during the calibration procedure. In some examples, the output signal provided by the density sensor can be based on a reflection capability of the plurality of print materials delivered to the ITB during the calibration procedure.

The example medium 1000 stores instructions 1070 executable by the processing resource 1080 to provide a notification regarding the print material density abnormality on a display device associated with the laser printing device. The print material density abnormality can occur during the calibration procedure. In other words, the print material density is not uniform during the calibration procedure. In some examples, the cause for the print material density abnormality can be a change in a stability of a laser beam (shown as 116-1, 116-2, 116-3, and 116-4 in FIG. 1) from the number of laser diodes. As such, in some examples, the change in the stability of the number of laser diodes is a decrease in strength. In some examples, the change in the stability of the number of laser diodes is an increase in strength.

The above stated examples are non-limiting and are not strictly subject to performance in the order presented in the examples. As such, underlying points presented by the examples can be performed in various other ways, including either at a greater expanse or a further limitation relative to the examples.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

What is claimed:

1. A system comprising:
   a memory resource; and
   a processing resource executing instructions stored in the memory resource to:
   set a range of print material density values based on an initial print material density of a first print material delivered to a printing component of a printing device, wherein a print material density measured outside of the set range is a print material density abnormality;
   perform a calibration procedure for the printing device including the printing component;
   deliver a print material arranged in a compound shape to a calibration image on the printing component included in the printing device;
   measure the print material density of the print material on the calibration image of the compound shape during the calibration procedure via a density sensor included in the printing device;
   detect an abnormality in the print material density via signal analysis instructions and data from measuring the print material density of the print material from a material developer; and
   provide a notification regarding the print material density abnormality.

2. The system of claim 1, wherein the signal analysis instructions detects the abnormality in the print material density based on an output from the density sensor.

3. The system of claim 1, wherein the print material density is measured on the printing component included in the printing device.

4. The system of claim 1, wherein the calibration image of the compound shape is from a group consisting of:
   a concave polygon;
   a cross figure; and
   two lines forming a right angle.

5. The system of claim 1, wherein the calibration image of the compound shape is from a group consisting of:
   an ellipse; and
   a triangle.

6. The system of claim 1, wherein the notification is selected from a group consisting of:
   a title of the printing system;
   a date of the print material density abnormality detection;
   a time of the print material density abnormality detection;
   a magnitude of the print material density abnormality; and
   an error log of the print material density abnormality.

7. A method comprising:
   setting a range of print material density values based on an initial print material density of a first print material delivered to a printing component of a printing device, wherein a print material density measured outside of the set range is a print material density abnormality;
   performing a calibration procedure utilizing a diode coupled to the printing component included in the printing device;
   delivering a print material arranged in a plurality of compound shapes to a plurality of calibration images on the printing component included in the printing device;
   measuring the print material density of the print material within the plurality of compound shapes via a number of density sensors coupled to the printing component;
   detecting an abnormality of the print material density via signal analysis instructions executed in the calibration procedure and data from measuring the print material density of the print material from a material developer; and
   providing a notification regarding the print material density including the print material density abnormality, wherein the print material density abnormality comprises a change in a stability of a diode output.

8. The method of claim 7, wherein the diode is a laser diode.

9. The method of claim 7, wherein the printing component includes an imaging drum.

10. The method of claim 7, wherein the printing component includes an intermediate transfer belt.

11. The method of claim 7, wherein the plurality of calibration images includes areas of different sizes.

12. The method of claim 7, wherein the change in the stability of the diode output is a decrease in the stability of the diode output.

13. A non-transitory machine-readable medium storing instructions executable by a processing resource to:
   set a range of print material density values based on an initial print material density of a first print material delivered to a printing component of a laser printing device, wherein a print material density measured outside of the set range is a print material density abnormality;
   perform a calibration procedure that utilizes a number of laser diodes coupled to the laser printing device;
   deliver a plurality of print materials arranged in a compound shape to a plurality of calibration images on an intermediate transfer belt (ITB) marked by the number of laser diodes coupled to the laser printing device;
   measure the print material density of the plurality of print materials delivered to the plurality of calibration images of the compound shape via a density sensor coupled to the ITB;
   based on an output signal from the density sensor, detect the print material density abnormality via signal analysis instructions executed during the calibration procedure and data from measuring the print material density of the print material from a material developer; and
   provide a notification regarding the print material density abnormality on a display device associated with the laser printing device.

14. The non-transitory machine readable medium of claim 13, wherein each of the plurality of print materials comprises a different color of cyan, magenta, yellow, and black.

15. The non-transitory machine readable medium of claim 13, wherein the output signal provided by the density sensor is based on a reflection capability of the plurality of print materials delivered to the ITB during the calibration procedure.

* * * * *